United States Patent
Larkela (10) Patent No.: US 11,874,760 B2
(45) Date of Patent: Jan. 16, 2024

(54) METHOD AND SYSTEM FOR MANAGING PERFORMANCE FOR USE CASES IN SOFTWARE APPLICATIONS

(71) Applicant: Larmik Oy, Turku (FI)

(72) Inventor: Mikko Larkela, Turku (FI)

(73) Assignee: Lermik Oy, Turku (FI)

( * ) Notice: Subject to any disclaimer, the term of this patent is extended or adjusted under 35 U.S.C. 154(b) by 18 days.

(21) Appl. No.: 17/366,160

(22) Filed: Jul. 2, 2021

(65) Prior Publication Data

US 2022/0043737 A1 Feb. 10, 2022

(30) Foreign Application Priority Data

Aug. 7, 2020 (EP) .................... 20189958

(51) Int. Cl.
*G06F 9/44* (2018.01)
*G06F 11/36* (2006.01)
*G06F 11/32* (2006.01)

(52) U.S. Cl.
CPC ........ *G06F 11/3612* (2013.01); *G06F 11/327* (2013.01); *G06F 11/3688* (2013.01)

(58) Field of Classification Search
CPC . G06F 11/3612; G06F 11/327; G06F 11/3688
See application file for complete search history.

(56) References Cited

U.S. PATENT DOCUMENTS

| 10,678,678 B1* | 6/2020 | Tsoukalas ........... G06F 11/3664 |
| 2005/0055673 A1 | 3/2005 | Dias et al. |
| 2005/0086263 A1* | 4/2005 | Ngai .................... G06F 16/217 |
| 2006/0230306 A1* | 10/2006 | Richards .............. G06F 11/076 714/6.32 |
| 2013/0198722 A1* | 8/2013 | Adams ................ G06F 11/3428 717/127 |
| 2016/0004621 A1 | 1/2016 | Gongloor et al. |
| 2016/0026557 A1* | 1/2016 | Hwang ............... G06F 11/3664 717/124 |
| 2019/0095470 A1 | 3/2019 | Dundjerski et al. |
| 2019/0114167 A1* | 4/2019 | Biddle ................ G06F 11/3668 |

OTHER PUBLICATIONS

European Patent Office, Extended European Search Report, Application No. 20189958.0, dated Jan. 25, 2021, 10 pages.

* cited by examiner

*Primary Examiner* — Hang Pan
(74) *Attorney, Agent, or Firm* — Ziegler IP Law Group (57) ABSTRACT

A method for managing a performance for at least one use case in a software application. The method includes: executing, for a first instance, a plurality of statements pertaining to a given use case on a target database, the plurality of statements being a part of the software application; collecting first performance metrics pertaining to the first instance of execution of the given use case; executing, for a second instance, the plurality of statements on the target database; collecting second performance metrics pertaining to the second instance of execution of the given use case; comparing the first performance metrics and the second performance metrics to determine difference therebetween; and executing at least one alarm action when the difference is greater than a predefined threshold.

16 Claims, 4 Drawing Sheets

METHOD AND SYSTEM FOR MANAGING PERFORMANCE FOR USE CASES IN SOFTWARE APPLICATIONS

TECHNICAL FIELD

The present disclosure relates generally to software technologies; and more specifically, to methods for managing performance for at least one use case in software applications. The present disclosure also relates to systems for managing performance for at least one use case in software applications. Moreover, the present disclosure also relates to computer program products for managing performance for at least one use case in software applications.

BACKGROUND

Over the decades, software technologies have gained popularity due to continued technological advancements in software development. Nowadays, entire world is connected to several software applications pertaining to healthcare, lifestyle, accounting, reservation, banking, e-commerce, wellness application and the like. The world is evolving at a rapid pace, and the software applications are being designed and improved to match trends in such evolution. Development of techniques for monitoring and analyzing performance of said software applications is important in order to raise the bar for customer experience.

However, existing techniques for monitoring and analyzing performance of the software applications are associated with several limitations. Firstly, the existing techniques, when employed during agile software development, requires developer expertise and several analytical tools to analyze statements (namely, source code) pertaining to the software applications and monitor database statistics associated therewith. This requires considerable time and is often error-prone and expensive. For example, when functionalities of the software applications change with further development of the software technologies, consequences of the changes are not be analyzed conveniently. Analysis of statistics of databases associated with the software applications is a manual, time-consuming and lengthy process. Moreover, analysis of revisions of these statistics due to changes in software applications is extremely cumbersome. Secondly, the existing techniques are typically used for performance improvement of the software applications after release of the software applications. Post-release performance monitoring and analysis may be too late and involves computationally intensive analysis that requires expertise. Based on the expertise of personnel involved, costly actions may be initiated. For example, recommendations of the personnel involved may require few change(s) in the released software applications. This generally initiates costly actions and inconvenience for entities involved in the performance improvement of said application. Moreover, implementing such change(s) might have a huge impact on working functionality of said application. Thirdly, the existing techniques are not flexible in terms of integration with existing test automation tools for software testing.

Therefore, in light of the foregoing discussion, there exists a need to overcome the aforementioned drawbacks associated with existing techniques for monitoring and analyzing performance of the software applications.

SUMMARY

The present disclosure seeks to provide a method for managing a performance for at least one use case in a software application. The present disclosure also seeks to provide a system for managing a performance for at least one use case in a software application. The present disclosure also seeks to provide a computer program product for managing a performance for at least one use case in a software application. The present disclosure seeks to provide a solution to the existing problems of high costly actions, high time consumption, error-prone process, expertise requirement, delay in post-release performance monitoring, inflexibility in integrating with test automation tools, associated with existing techniques for monitoring and analyzing performance of the database-oriented software applications. An aim of the present disclosure is to provide a solution that overcomes at least partially the problems encountered in prior art, and provides a method for managing a performance for at least one use case in a software application that is efficient, accurate and reliable in terms of automatically monitoring and analysing performance for the at least one use case in the software application during software development.

In one aspect, an embodiment of the present disclosure provides a method for managing a performance for at least one use case in a software application, the method comprising:

executing, for a first instance, a plurality of statements pertaining to a given use case on a target database, the plurality of statements being a part of the software application;
  collecting first performance metrics pertaining to the first instance of execution of the given use case;
  executing, for a second instance, the plurality of statements on the target database;
  collecting second performance metrics pertaining to the second instance of execution of the given use case;
  comparing the first performance metrics and the second performance metrics to determine at least one difference therebetween; and
  executing at least one alarm action when the at least one difference is greater than a predefined threshold.

In another aspect, an embodiment of the present disclosure provides a system for managing a performance for at least one use case in a software application, the system comprising a server arrangement configured to:

execute, for a first instance, a plurality of statements pertaining to a given use case on a target database, the plurality of statements being a part of the software application;
  collect first performance metrics pertaining to the first instance of execution of the given use case;
  execute, for a second instance, the plurality of statements on the target database;
  collect second performance metrics pertaining to the second instance of execution of the given use case;
  compare the first performance metrics and the second performance metrics to determine at least one difference therebetween; and
  execute at least one alarm action when the at least one difference is greater than a predefined threshold.

In yet another aspect, an embodiment of the present disclosure provides a computer program product for managing a performance for at least one use case in a software application, the computer program product comprising a non-transitory machine-readable data storage medium having stored thereon program instructions that, when accessed by a processing device, cause the processing device to:

execute, for a first instance, a plurality of statements pertaining to a given use case on a target database, the plurality of statements being a part of the software application;

collect first performance metrics pertaining to the first instance of execution of the given use case;

execute, for a second instance, the plurality of statements on the target database;

collect second performance metrics pertaining to the second instance of execution of the given use case;

compare the first performance metrics and the second performance metrics to determine at least one difference therebetween; and execute at least one alarm action when the at least one difference is greater than a predefined threshold.

Embodiments of the present disclosure substantially eliminate or at least partially address the aforementioned problems in the prior art, and enable efficient, accurate, and reliable management of a performance for at least one use case in a software application.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for managing a performance for at least one use case in a software application, the method comprising:

executing, for a first instance, a plurality of statements pertaining to a given use case on a target database, the plurality of statements being a part of the software application;

collecting first performance metrics pertaining to the first instance of execution of the given use case;

executing, for a second instance, the plurality of statements on the target database;

collecting second performance metrics pertaining to the second instance of execution of the given use case;

comparing the first performance metrics and the second performance metrics to determine at least one difference therebetween; and executing at least one alarm action when the at least one difference is greater than a predefined threshold.

In another aspect, an embodiment of the present disclosure provides a system for managing a performance for at least one use case in a software application, the system comprising a server arrangement configured to:

execute, for a first instance, a plurality of statements pertaining to a given use case on a target database, the plurality of statements being a part of the software application;

collect first performance metrics pertaining to the first instance of execution of the given use case;

execute, for a second instance, the plurality of statements on the target database;

collect second performance metrics pertaining to the second instance of execution of the given use case;

compare the first performance metrics and the second performance metrics to determine at least one difference therebetween; and execute at least one alarm action when the at least one difference is greater than a predefined threshold.

In yet another aspect, an embodiment of the present disclosure provides a computer program product for managing a performance for at least one use case in a software application, the computer program product comprising a non-transitory machine-readable data storage medium having stored thereon program instructions that, when accessed by a processing device, cause the processing device to:

execute, for a first instance, a plurality of statements pertaining to a given use case on a target database, the plurality of statements being a part of the software application;

collect first performance metrics pertaining to the first instance of execution of the given use case;

execute, for a second instance, the plurality of statements on the target database;

collect second performance metrics pertaining to the second instance of execution of the given use case;

compare the first performance metrics and the second performance metrics to determine at least one difference therebetween; and execute at least one alarm action when the at least one difference is greater than a predefined threshold.

The present disclosure provides the aforementioned method, the aforementioned system, and the aforementioned computer program product for managing the performance for the at least one use case in the software application. The performance of the at least one use case can beneficially be monitored prior to release of the software application, by executing the plurality of statements pertaining to the at least one use case for multiple instances. Based on differences between the first performance metrics and the second performance metrics, errors (namely, non-conformities) in the at least one use case are flagged automatically by executing the at least one alarm action when said difference is greater than the predefined threshold. This manner of monitoring and analyzing use case performance is automated, logical, time and cost efficient, and free from errors. Beneficially, when the at least alarm action is executed, a user (for example, a database administrator of the target database or a developer of the software application) is notified regarding out of bound performance metric variations between multiple executions of the at least one use case. This facilitates the user to easily identify and rectify problems in the software application, in real time or near real time during software development. The method and the system are flexible in terms of integration with any suitable test automation tools (for example, a test suite, a DevOps tool, and the like) for testing a performance of the software application. The method is well suited for monitoring and improving performance for the at least one use case in the software application prior to release of the software application. This can be attributed to the fact that the method is computationally simple, logical, and time efficient. This facilitates in minimizing requirement of an expert person, avoids difficulties associated with post-release software application improvements, and enables in saving costs. The system is reliable and can be implemented and used easily.

Throughout the present disclosure, the term "server arrangement" refers to an arrangement of at least one server that, when operated, performs the aforementioned steps of the method for managing the performance for the at least one use case in the software application (namely, a client application). It will be appreciated that the server arrangement can be implemented in several ways. In an example, the server arrangement could be implemented as a single server. In another example, the server arrangement could have a distributed architecture wherein the server arrangement comprises a plurality of servers. In yet another example, server arrangement could be implemented by way of a cloud server arrangement. In an example, the server arrangement comprises a Java Message Service (JMS) server.

Optionally, the system further comprises a data repository. Herein, the term "data repository" refers to hardware, software, firmware, or a combination of these for storing a given information in an organized (namely, structured) manner, thereby, allowing for easy storage, access (namely, retrieval), updating and analysis of the given information. Optionally, the data repository database comprises an application database. Optionally, the application database comprises a plurality of statements pertaining to the at least one use case of the software application. Moreover, optionally, the application database comprises statements pertaining to use cases of a plurality of software applications.

Optionally, the server arrangement is communicably coupled to the data repository wirelessly and/or in a wired manner. Optionally, the server arrangement is communicably coupled to the data repository via a communication network. It will be appreciated that the communication network may be wired, wireless, or a combination thereof. Examples of the communication network may include, but are not limited to, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a radio network.

The aforesaid method is implemented by a performance management tool. The performance management tool is to be understood to be implemented as a system comprising the server arrangement, the data repository (which comprises at least one database), and at least one executable (for example, such as a dashboard application). The performance management tool is also capable of providing at least one interactive user interface. The at least one executable of the performance management tool is executed on the at least one server. The performance management tool interfaces with a target system.

Optionally, the method further comprises providing a user with an interactive user interface to enable the user to select the given use case for which performance is to be managed. The interactive user interface is provided on a device associated with the user. Optionally, the interactive user interface is a dedicated user interface pertaining to the software application.

Throughout the present disclosure, the term "use case" refers to a particular scenario in which the software application is being used by a user. It will be appreciated that the term "at least one use case" refers to "one use case" in some implementations, and "a plurality of use cases" in other implementations. In an example, for an address book software application, the use cases may be "add a person", "create new address book", "sort entries by name", and the like.

Optionally, the software application is database-oriented software application pertaining to, healthcare, lifestyle, accounting, reservation, banking, e-commerce, wellness application, and the like. It will be appreciated that the method enables managing the performance for the at least one use case in the software application during development of the software application, prior to release of the software application. However, the method may also be employed to manage the performance for the at least one use case in the software application after release of the software application.

Throughout the present disclosure, the term "target database" refers to a systematic collection of information pertaining to the target system (namely, a client system or a target database system or a target database management system) for which the software application is designed. The target database is to be understood to be a target system database or a client database. The target system is a system that includes at least the target database and server(s) to execute at least one executable, and is also capable of providing interactive user interfaces (for example, to its customers or users). The target system is different from the system for managing the performance for the at least one use case in the software application. In an example, there may be a supermarket for which a software application may be designed. A target system for the supermarket would, for example, include a server, executables pertaining to the software application, and a supermarket database. The supermarket database may include information pertaining to employees of the supermarket, customers of the supermarket, products in the supermarket, and the like. Herein, the supermarket database may be the target database. As an example, developer of the software application for the supermarket may use the performance management tool to enable further improvement of the target system for the supermarket.

Optionally, performance management tool executes on a local server arrangement, whereas the target system is implemented as a remote system.

Optionally, the method further comprises populating the target database with a test dataset, wherein the step of populating the target database is performed prior to executing the plurality of statements pertaining to the given use case for the first instance. Optionally, in this regard, the method further comprises re-loading the target database with the test dataset, wherein the step of re-loading the target database is performed after each instance of execution of the plurality of statements pertaining to the given use case. It will be appreciated that the step of reloading is optionally performed when the plurality of statements modify (for example, create information, update information, delete information, and the like) the test dataset in a given execution of the plurality of statements pertaining to the given use case.

Optionally, the user initiates, via the interactive user interface, the execution of the plurality of statements. Optionally, the plurality of statements are executed line by line in a debugger. Optionally, an identifier (for example, a string of alphanumeric and special characters) is automatically assigned to the given use case for a given execution (namely, a given run) of the plurality of statements pertaining to the given use case is carried out. It will be appreciated that the plurality of statements are a part of the software application. Moreover, different use cases of the software application have different statements pertaining thereto.

Notably, each instance of execution of the plurality of statements on the target database is an iteration of execution of the given use case. It will be appreciated that the plurality of statements pertaining to the given use case are executed on the target database for not only the first instance and the second instance, but for several instances which may be greater than or equal to two instances. As an example, for managing performance of the given use case, the plurality of statements pertaining to the given use case may be executed on the target database for five instances. An example algorithm of two consecutive instances of executions of statements is provided in the Appendix hereinbelow.

Optionally, the method further comprises enabling, via the interactive user interface, the user to record entire method for managing performance of the given use case in a software application. In this regard, optionally, a given recording session is automatically given an identifier same as that of the given use case being managed.

Optionally, the method further comprises enabling, via the interactive user interface, the user to select at least one filter, wherein the at least one filter is to be employed while the plurality of statements are being executed on the target database. It will be appreciated that the at least one filter enables the user to filter out information in the target database upon which the plurality of statements are not required to be executed. This facilitates reduction in processing time and consumption of processing resources, as the plurality of statements are only executed on requisite information in the target database. In an example, the user may select a filter to skip a given number of tables in the target database that may not be required to be tested. This allows the plurality of statements to be executed on a limited, required number of tables in the target database.

Optionally, a given statement is one of: a Structured Query Language (SQL) statement, a Not only SQL (NoSQL) statement. It will be appreciated that managing the performance of the given use case in the software application takes a generic Application Programming Interface (API) approach, irrespective of which target database is employed.

Optionally, the SQL statements pertaining to the given use case execute on a relational database. In such a case, the target database is implemented as the relational database. Examples of the relational database include, but are not limited to, Oracle, PostgreSQL, MySQL, MariaDB, Microsoft SQL server, IBM DB2.

Alternatively, optionally, the NoSQL statements pertaining to the given use case execute on a non-relational database. In such a case, the target database is implemented as the non-relational database. Examples of the non-relational database includes, but are not limited to, MongoDB, Cosmos DB, DocumentDB, Cassandra, Coachbase, HBase, Redis, Neo4j.

Upon executing for the first instance and the second instance, the plurality of statements pertaining to the given use case, the first performance metrics and the second performance metrics are collected, respectively, from a digest table in the target database. An example logic corresponding to collecting different metrics in different databases is provided in the Appendix hereinbelow. Optionally, the digest table is extracted, via an agent module, from the target system. Herein, the term "digest table" refers to a data structure (in the target database) where the target system stores information pertaining to a given performance metrics (pertaining to a given instance of execution of the given use case). Optionally, the digest table stores said information in form of rows and columns (in a raw data file). As an example, the digest table may be in form of a Microsoft® Excel spreadsheet.

Optionally, the digest table is cleared prior to the given instance of execution of the plurality of statements pertaining to the given use case. Optionally, the digest table stores statistics and/or information pertaining to one or more of: latency, errors, missing index indication, and query volume, for each statement amongst the plurality of statements pertaining to the given use case. Notably, for the given use case, the second performance metrics is an iteration over the first performance metrics. The digest table corresponding to the given use case is extracted from the target database and is stored in the data repository per use-case performance management session under a given identifier.

The term "agent module" refers to an independently operating computer program that performs computing tasks on behalf of the system (also referred to as the performance management tool). The performance management tool is interfaced (namely, linked) to the target system via the agent module. Optionally, the agent module comprises an application agent (namely, a dashboard agent) and an agent database.

It will be appreciated that the system (namely, the performance management tool) provides capabilities to compare performance metrics pertaining to all instances of execution of the given use case. In this regard, the performance metrics are retrieved from the data repository using the given identifier of the given use case as a primary search parameter. Other parameters (for example, such as time) could be used to further refine the search.

Throughout the present disclosure, the term "performance metrics" refers to statistics and/or information pertaining to a set of attributes which are indicative of performance of the given use case at a given instance of execution. Optionally, the first performance metrics and/or the second performance metrics are represented as at least of: a pie chart, a table, a histogram, a bar chart, a line graph, a box plot, a pictogram, a scatter diagram.

Optionally, the first performance metrics and the second performance metrics comprise at least one of: a number of statements in the plurality of statements, a number of read rows in the target database, a central processing unit (CPU) usage, a memory usage, a missing index, a number of disk reads, database system level properties, a number of deadlocks, a number of lock wait timeouts, a duration of a given lock wait timeout, a number of commits, a number of rollbacks, a number of failed statements, response time, a number of sorts, sort time, a number of warnings.

In this regard, the first performance metrics and the second performance metrics comprise statistics and/or information pertaining to at least one of the set of attributes listed above. It will be appreciated that quantifiable statistics and/or understandable information pertaining to the set of attributes enables the user to easily understand problems (if any) in the performance of the given use case at the given instance of execution.

In an example, the first performance metrics may comprise that the number of statements in the plurality of statements is 300, the CPU usage is 20 percent, the number of failed statements is one and the number of warnings is one. The second performance metrics may comprise that the number of statements in the plurality of statements is 300, the CPU usage is 20 percent, the number of failed statements is zero and the number of warnings is zero.

Optionally, the method further comprises enabling, via the interactive user interface, the user to select at least one attribute for which performance metrics is to be collected.

Optionally, the method further comprises:
  enabling, via the interactive user interface, the user to specify a performance evaluation interval pertaining to the given use case;
  executing for the performance evaluation interval, the plurality of statements, on the target database;
  collecting, from the target system, interval-specific performance metrics pertaining to the given use case; and
  analyzing the interval-specific performance metrics to identify, in the software application, spikes that are required to be examined.

Herein, the term "performance evaluation interval" refers to a time interval specified by the user for which interval-specific performance metrics are required to be collected for identifying and evaluating the spikes.

Optionally, the interval-specific performance metrics pertaining to the given use case are useful for analyzing any spike in the software application. Herein, the term "spike" refers to a behavior of the software application working under a dynamic (namely, rapidly increasing and rapidly decreasing) load (namely, traffic) generated by users of the software application. Optionally, such behavior is ascertained by spike testing of the software application to make sure that no issue would arise in speed, stability and scalability of the software application, after release of the software application. It will be appreciated that the spike testing of the software application optionally enables a developer of the software application to estimate at least one of: a threshold point where the software application crashes (namely, fails) and/or slows down, a recovery time between two consecutive spikes. This facilitates the developer of the software application to identify and rectify problem areas pertaining to such spike issues while developing the software application.

Optionally, the at least one difference between the first performance metrics and the second performance metrics is calculated as a percent change between the first performance metrics and the second performance metrics. Optionally, the step of determining the at least one difference employs at least one mathematical formula. In an example, the first performance metrics may comprise that the number of read rows in the target database is 200, and the memory usage is 60 percent. The second performance metrics may comprise that the number of read rows in the target database is 240, and the memory usage is 63 percent. Herein, differences between the first performance metrics and the second performance metrics are 22 percent (for the attribute of the number of read rows in the target database) and 5 percent (for the attribute of the memory usage).

Optionally, the method comprises comparing current performance metrics and baseline performance metrics to determine at least one difference therebetween. Herein, the term "current performance metrics" refers to performance metrics pertaining to a current instance of execution of the given use case, whereas the term "baseline performance metrics" refers to performance metrics pertaining to a baseline instance of execution of the given use case. The current instance of execution of the given use case is later than the baseline instance of execution of the given use case. The baseline instance of execution may be a reference instance of execution prior to release of the software application, an instance of execution at the time of release of the software application (after its development), or any other instance of execution that is selected to serve as the baseline instance of execution. In such a case, the baseline performance metrics are treated as standard performance metrics, and all other subsequent performance metrics pertaining to subsequent instances of execution are compared with the baseline performance metrics.

Optionally, the current performance metrics are compared with performance metrics of an immediately preceding instance of execution of the given use case. When the current performance metrics are the first performance metrics, no comparison is performed.

Throughout the present disclosure, the term "alarm action" refers to an action that alerts the user that the at least one difference is greater than a predefined threshold. The at least one alarm action involves flagging of an error in performance of the given use case or a non-conformance of the performance of the given use case with the predefined threshold.

Optionally, the at least one alarm action comprises sending at least one of: a ticket, an email, a visual user-interface alarm, a push notification, a notification using a business communication platform. Optionally, in this regard, at least one of the above-mentioned indications is sent to at least one of: a database administrator of the target database, a developer of the software application, the user of the system. Optionally, the at least one of the above-mentioned indications is displayed at a dashboard and/or identified from a dashboard. Herein, the term "dashboard" refers to an interactive user interface of the performance management tool. Optionally, the dashboard is provided by the dashboard application. Optionally, the performance management tool comprises a "dashboard database" that comprises monitoring results pertaining to a given execution of the given use case.

Optionally, the ticket is raised using a ticketing software. For example, a JIRA ticket may be raised using JIRA Service Desk software. Optionally, the notification sent using the business communication platform is a graphical notification, a text notification, an audio notification, and the like. Examples of the business communication platforms include, but are not limited to, Slack, Blink, Atlassian, Fuze, Zoom. Optionally, the at least one alarm action is executed on the server arrangement of the system.

Optionally, the method further comprises enabling, via the interactive user interface, the user to set the predefined threshold pertaining to execution of the at least one alarm action. Optionally, the user is enabled to set different predefined thresholds corresponding to different attributes of the first performance metrics and second performance metrics. In this way, the user sets his/her own custom rules with respect to execution of the at least one alarm action. Optionally the predefined threshold is at least one of: a percent limit to failure, a percent limit to warning, a percent limit to success, a percent limit to improvement, of at least one attribute of the first performance metrics and second performance metrics.

Optionally, the method comprises storing, at the data repository, at least one of: the plurality of statements pertaining to the given use case, the first run performance metrics, the second run performance metrics, the comparison of the first run performance metrics and the second run performance metrics, the predefined threshold to be employed for executing the at least one alarm action.

In an example, a given statement may be executed, for a first instance, on the target database to selectively scan tables in the target database. There may be a change in the given statement such that when the given statement is executed, for a second instance, on the target database, all tables in the target database are scanned. In such a case, the number of read rows in the target database and the CPU usage would increase during the second instance of execution. In that case, the at least alarm action is executed for all use cases which may be affected by the change, when the method is executed for managing performance of said use cases. It will be appreciated that such affected use cases are identified in real time or near real time, and this facilitates the database administrator of the target database and/or the developer of the software application to fix use-case performance problems immediately. When the at least one alarm action is executed, the given statement which has been changed between the first instance of execution and the second instance of execution can be displayed at the dashboard and/or identified from the dashboard.

In another example, a lock wait timeout may occur when one transaction (that is composed of one or more statements pertaining to a given use case) tries to acquire a lock whose mode conflicts with a lock held by another transaction. Excessive duration of lock wait timeout often translates into poor response time, so it is important to monitor the duration of the lock wait timeout so that affected use cases are not failed. The at least alarm action may be executed for all use cases which may be affected due to the excessive duration of the lock wait timeout. When the at least one alarm action is executed, statements in the affected use cases that are waiting can be displayed at the dashboard and/or identified from the dashboard. The dashboard has options for updating and/or deleting the statements. In this regard, a user can update and/or delete the statements in order to identify reason of the lock wait timeout. After updating and/or deleting the statements, performance of the affected use cases would improve, and the affected use cases would be displayed at the dashboard.

In yet another example, a software application may be implemented in manner that failed statements pertaining to a given use case are not visible to a user. In such a case, the at least alarm action is executed, and the failed statements can be displayed at the dashboard and/or identified from the dashboard.

In still another example, a difference between the first performance metrics and the second performance metrics for an attribute of memory usage may be 15 percent, and the predefined threshold may be 10 percent. In such a case, the at least alarm action is executed.

In yet another example, a difference between the first performance metrics and the second performance metrics for an attribute of response time may be 7 milliseconds, and the predefined threshold may be 5 milliseconds. In such a case, the at least alarm action is executed.

In still another example, a difference between the first performance metrics and the second performance metrics for an attribute of number of warnings may be two, and the predefined threshold may be one. In such a case, the at least alarm action is executed.

Optionally, the method further comprises:
distinguishing a plurality of statements based on a plurality of software applications for which use case performance is to be managed;
managing performances of use cases in the plurality of software applications; and
dividing results pertaining to the performances of the use cases in the plurality of software applications in a manner that requisite results are provided to a plurality of users associated with the plurality of software applications.

Optionally, the method further comprises:
analyzing the first performance metrics and/or the second performance metrics to identify a problem in at least one of the plurality of statements and/or at least one database element of the target database;
determining at least one corrective action to be executed, based on the identified problem; and
executing the at least one corrective action to modify the at least one of the plurality of statements and/or the at least one database element of the target database.

Optionally, the method further comprises generating a performance report, based on the analysis of the first performance metrics and/or the second performance metrics. In this regard, the problems are identified using the performance report. Optionally, the performance report comprises information pertaining to the at least one of the plurality of statements and/or the at least one database element (for example, tables, records, fields, and the like) that is/are responsible for degrading the first performance metrics and/or the second performance metrics. For example, the problem may be that the at least one of the plurality of statements is incorrect and the at least one database element is incorrectly used for testing the performance of the given use case. Optionally, a given performance report is generated in form of at least one of: a text, an image, an audio, a graph, a chart, a table. These elements are user-friendly representations that enable quick and effective analysis of the performance report.

Optionally, the first performance metrics and/or the second performance metrics are analyzed by at least one of: a mathematical formula, an analytical function, a logical analysis technique.

Optionally, the problem is identified based on at least one of: the performance report, the at least one alarm action. Optionally, the problems are automatically identified based on at least one of the aforesaid criteria. Alternatively or additionally, optionally, the problems are identified by user, based on at least one of the aforesaid criteria.

Throughout the present disclosure, the term "corrective action" refers to an action that is executed to rectify and eliminate the identified problem, thus preventing its recurrence. Such an action is corrective in nature. The at least one corrective action, when executed, would improve performance metrics of the given use case, for subsequent instances of execution of the given use case. Optionally, the at least one corrective action is executed automatically by the server arrangement.

Optionally, the at least one corrective action comprises at least one of: proposing to add a service to application cache, issuing a warning, suggesting change in predicate order, notifying use of avoidable syntax, notifying in case of difference in data types and lengths, suggesting use of lowest transaction isolation level, suggesting avoidable keywords, verifying join-predicates when joining tables, using joins instead of separate selects.

In an example, when the identified problem is that a given statement is greater than 50 lines, a warning may be issued.

In another example, when the identified problem is that a given statement may be executed on an entirety of a given table of the target database, a notification is raised to use avoidable syntax (for example, such as SELECT*). In such a case, the given statement is modified to execute on a limited number of rows and columns of the given table of the target database.

In yet another example, when the identified problem is that a first statement (pertaining to parent tables in the target database) may be executed 25334 times, and a second statement (pertaining to child tables in the target database) may be executed 25334 times. Herein, a total number of execution of statements is 50668. In such a case, the parent tables and the child tables are identified using a foreign key, and subsequently joined together such that the total number of execution of statements would be 25334. In that case, performance metrics is improved by reducing the total number of execution of statements. An example logic corresponding to this example is provided in the Appendix hereinbelow.

In still another example, when the identified problem is that similar statements are executed repeatedly on a given table (table size may be less than 10000 rows), the dashboard may propose to add a service to part of application cache, such that the statements should not hit at the target database.

In yet another example, when the identified problem is that predicates on two or more tables are not ordered accurately, a suggestion may be raised to change predicate order by comparing existing indexes and primary key of the two or more tables.

In still another example, when the identified problem is that there is a difference in data types and lengths, a notification may be raised to match data types and the lengths.

In yet another example, when the identified problem is that there are lock wait time outs and blocking statements, the dashboard may suggest to use the lowest transaction isolation level.

In still another example, when the identified problem is that a given statement that is executed has at least of: SELECT DISTINCT, ORDER BY, GROUP BY, SELECT COUNT(*), a notification may be raised on the dashboard to check and avoid using such statement.

In yet another example, when the identified problem is associated with joining two or more tables, a suggestion is raised to verify join-predicates when joining the two or more tables, by checking that all columns of the two or more tables are used in foreign key whilst joining.

In still another example, when the identified problem is that statements are equivalent to sub-statements, a warning may be issued to use joins to join the sub-statements.

In yet another example, the identified problem may be a Hibernate problem such as "N+1 select issue" problem in statements executed at a given instance of execution of the given use case. In such a case, the number of statements in the plurality of statements and the CPU usage may be undesirably high. In that case, an alarm action may be executed on the dashboard to notify the user to check for "N+1 select issue" problem, and a corrective action may comprise joining tables in the target database on which the statements are executed on. After the corrective action is executed, improvement in all affected (due to said problem) use cases may be observed. The at least one alarm action is executed when there occurs a new "N+1 select issue" problem.

Optionally, the method further comprises:
analyzing the first performance metrics and/or the second performance metrics to identify a problem in at least one of the plurality of statements and/or at least one database element of the target database;
determining, based on the identified problem, at least one advisory action to be recommended for modifying the at least one of the plurality of statements and/or the at least one database element of the target database; and
recommending the at least one advisory action to a concerned personnel.

The term "advisory action" refers to an action that is suggested to be executed to rectify and eliminate the identified problem, thus preventing its recurrence. The at least one advisory action is suggestive in nature, meaning that the concerned personnel may or may not act on it. The at least one advisory action, when executed, would improve performance metrics of the given use case, for subsequent instances of execution of the given use case.

Optionally, the at least one advisory action comprises recommending at least one alternate (namely, improvised) statement, based on the identified problem, to the concerned personnel. Optionally, the concerned personnel is at least one of: the database administrator of the target database, the developer of the software application. In this regard, optionally, the concerned personnel selects the at least one alternate statement to modify the at least one of the plurality of statements and/or the at least one database element. It will be appreciated that results pertaining to such modifications can be obtained by the concerned personnel in real time or near real time. It will also be appreciated that the at least one advisory action would improve performance metrics of the given use case for subsequent instances of execution of the given use case.

In an example, an advisory action may recommend using a keyword "EXPLAIN" when executing top worst statements on high priority tables in the target database. In such a case, with the help of the keyword EXPLAIN, the concerned personnel may identify tables amongst the high priority tables to which indexes are to be added. In that case, said statements would execute faster by using indexes to find rows of the tables. In another example, an advisory action may recommend using the keyword EXPLAIN to check whether or not an optimizer joins two or more tables in the target database in an optimal order. In such a case, in order to provide a hint to the optimizer to use a join order corresponding to order in which the two or more tables are named in a statement, the statement would begin with "SELECT STRAIGHT_JOIN" instead of "SELECT". However, the statement SELECT STRAIGHT_JOIN may prevent indexes from being used because it disables semi-join transformations of the two or more tables.

Optionally, the at least one use case comprises a plurality of use cases, and wherein the method further comprises:
enabling, via the interactive user interface, the user to add a set of configuration rules for generating an alert and/or for breaking a build of the software application in a case of any one of:
a given percentage of failed use cases out of the plurality of use cases being greater than a predefined threshold percentage,
a failure of at least one critical use case from amongst the plurality of use cases; and
employing the set of configuration rules for testing a performance of the software application.

Optionally, the set of configuration rules comprises at least one configuration rule for generating the alert and/or for breaking the build of the software application in a case of any one of the aforesaid conditions. Optionally, the at least one configuration rule specifies the predefined threshold percentage of failed use cases. The term "critical use case" refers to that use case from amongst the plurality of use cases of the software application, which is critically important (or has high priority) for successful performance of the software application. Failure of even one critical use case can lead to considerable performance degradation of the software application. When the set of configuration rules are optionally employed for testing the performance of the software application, unnecessary processing is minimized. This is attributed to the fact that the set of configuration rules is based on a minimum requisite criteria for successful testing of performance of the software application. In other words, when even the minimum requisite criteria is not met, it indicates that performance of the software application is unsatisfactory, and thus subsequent processing is halted. Thereafter, the alert is generated and/or the build of the software application is broken.

Optionally, the performance of the software application is tested using a testing tool (for example, a test suite) and/or a DevOps tool. Optionally, the testing tool and/or the DevOps tool are a part of the client system to which the dashboard application has access.

Optionally, the alert comprises at least one of: a ticket, an email, a visual user-interface alert, a push notification, a notification using a business communication platform.

In an example, there may be 100 use cases in the software application and the predefined threshold percentage of failed use cases may be 10 percent of total use cases in the software application. In such a case, the build of the software application is broken when 20 percent (or 20 use cases in the given software application) are found to have failed during testing of the performance of the software application. In another example, there may be 5 critical use cases amongst 100 use cases in the software application. In such a case, the alert is generated when even 1 use case amongst the 5 critical use cases fails.

Optionally, the method further comprises enabling, via the interactive user interface, the user to set a priority list of tables to be employed when testing the performance of the software application. Optionally, the user sets the priority list of tables by accessing the dashboard application. It will be appreciated that when the user set the priority list of tables, only data pertaining to the tables in the priority list would be analyzed when testing the performance of the software application. In such a case, the plurality of statements pertaining to the given use case would only execute on the tables in the priority list. In that case, said statements would execute faster.

Optionally, when the at least one use case comprises the plurality of use cases, the method further comprises:
grouping the plurality of use cases into a plurality of groups of use cases, wherein each group of use cases comprises one or more use cases; and
managing performance for the plurality of groups of use cases in a groupwise manner.

Optionally, in this regard, grouping the plurality of use cases into a plurality of groups of use cases is based on performance metrics of each of the plurality of use cases. For example, some use cases amongst the plurality of use cases that do not have satisfactory performance metrics are grouped together, while other use cases amongst the plurality of use cases that have satisfactory performance metrics are grouped together. Optionally, groups of use cases that do not have satisfactory performance metrics, are associated with a different visual indication (for example, highlighted in red color) as compared to groups of use cases that have satisfactory performance metrics (which, for example, are highlighted in green color). The different visual indication allows for easily distinguishing different groups of use cases. In such a case, performance of use cases belonging, for example, to a given red color group is managed on priority in a manner that the given red color group turns, for example, to a green color group when the use cases belonging to the given red color group are executed at a next instance. By grouping the use cases, the performance for all use cases in the group can be efficiently managed in a collective manner. It will be appreciated that using different visual indications is a normal procedure to report and inform the user regarding performance for all use cases.

Optionally, grouping the plurality of use cases into a plurality of groups of use cases is based on similarities between use cases. In this regard, similar uses cases are grouped together in one group. Optionally, grouping the plurality of use cases into a plurality of groups of use cases is based priority order of use cases. In this regard, high priority use cases are grouped together in one group, while low priority use cases are grouped together in another group. It will be appreciated that grouping the plurality of use cases may be based on any preferred criterion.

Throughout the present disclosure, the term "computer program product" refers to a software product comprising program instructions that are recorded on the non-transitory machine-readable data storage medium, wherein the software product is executable upon a computing hardware for implementing the aforementioned steps of the method for managing the performance for the at least one use case in the software application.

The non-transitory machine-readable data storage medium can direct a machine (such as computer, other programmable data processing apparatus, or other devices)

to function in a particular manner, such that the program instructions stored in the non-transitory machine-readable data storage medium cause a series of steps to implement the function specified in a flowchart and/or a schematic block diagram corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Throughout the present disclosure, the term "processing device" refers to a hardware, software, firmware, or a combination of these, for processing the program instructions of the computer program product.

The present disclosure also relates to the system as described above. Various embodiments and variants disclosed above, with respect to the aforementioned first aspect, apply mutatis mutandis to the system.

Optionally, a given statement is one of: a Structured Query Language (SQL) statement, a Not only SQL (NoSQL) statement.

Optionally, the at least one alarm action comprises sending at least one of: a ticket, an email, a visual user-interface alarm, a push notification, a notification using a business communication platform.

Optionally, the first performance metrics and the second performance metrics comprise at least one of: a number of statements in the plurality of statements, a number of read rows in the target database, a central processing unit (CPU) usage, a memory usage, a missing index, a number of disk reads, database system level properties, a number of deadlocks, a number of lock wait timeouts, a duration of a given lock wait timeout, a number of commits, a number of rollbacks, a number of failed statements, response time, a number of sorts, sort time, a number of warnings.

Optionally, the server arrangement is further configured to:
analyze the first performance metrics and/or the second performance metrics to identify a problem in at least one of the plurality of statements and/or at least one database element of the target database;
determine at least one corrective action to be executed, based on the identified problem; and
execute the at least one corrective action to modify the at least one of the plurality of statements and/or the at least one database element of the target database.

Optionally, the server arrangement is further configured to:
analyze the first performance metrics and/or the second performance metrics to identify a problem in at least one of the plurality of statements and/or at least one database element of the target database;
determine, based on the identified problem, at least one advisory action to be recommended for modifying the at least one of the plurality of statements and/or the at least one database element of the target database; and
recommend the at least one advisory action to a concerned personnel.

Optionally, when the at least one use case comprises a plurality of use cases, the server arrangement is further configured to:
enable, via an interactive user interface, a user to add a set of configuration rules for generating an alert and/or for breaking a build of the software application in a case of any one of:
a given percentage of failed use cases out of the plurality of use cases being greater than a predefined threshold percentage,
a failure of at least one critical use case from amongst the plurality of use cases; and
employ the set of configuration rules for testing a performance of the software application.

The present disclosure also relates to the computer program product as described above. Various embodiments and variants disclosed above, with respect to the aforementioned first aspect and second aspect, apply mutatis mutandis to the computer program product.

DETAILED DESCRIPTION OF THE DRAWINGS

Figure 1:
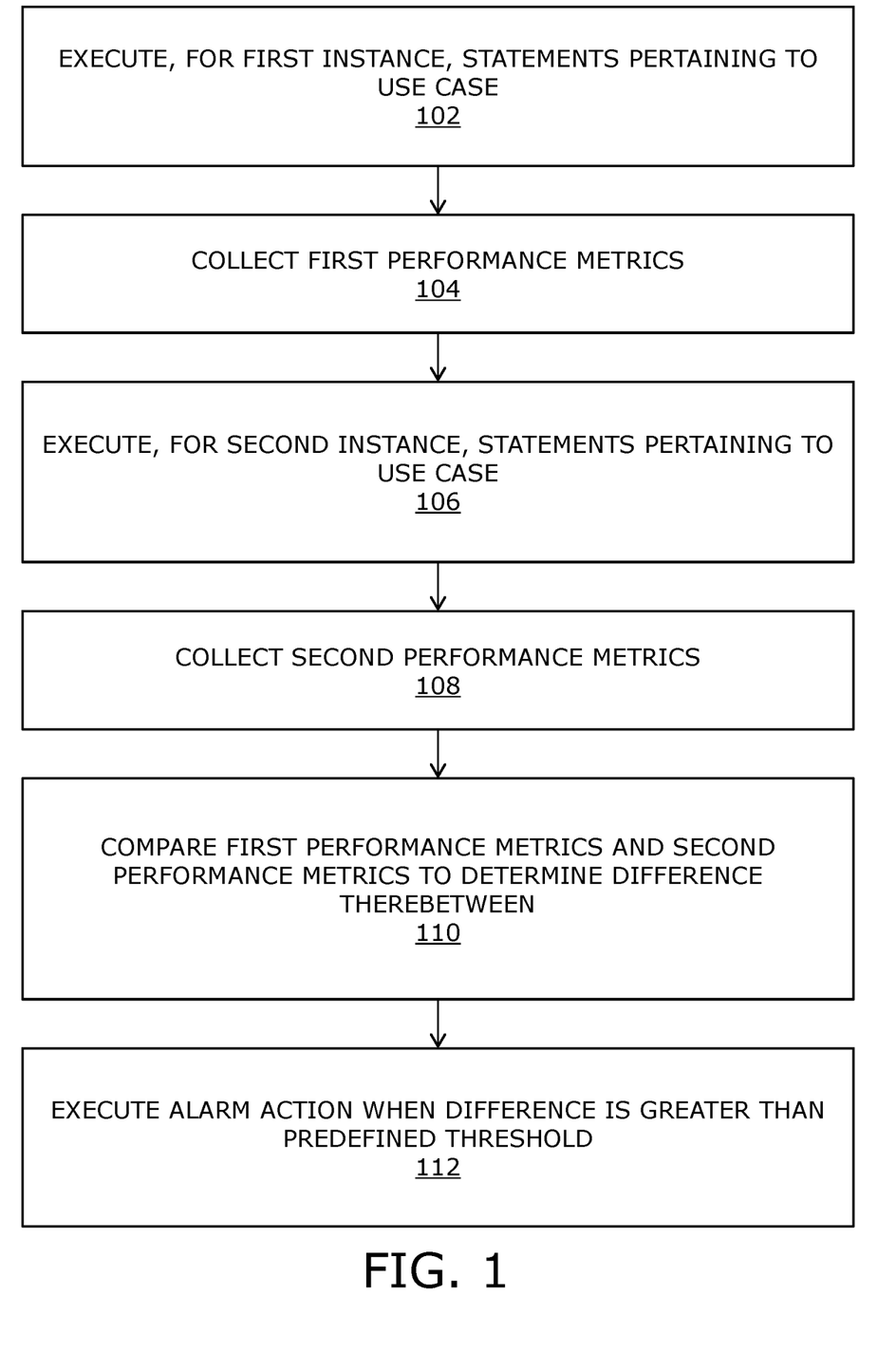
FIG. 1 illustrates steps of a method for managing a performance for at least one use case in a software application, in accordance with an embodiment of the present disclosure.

Referring to FIG. 1, illustrated are steps of a method for managing a performance for at least one use case in a software application, in accordance with an embodiment of the present disclosure. At step 102, a plurality of statements pertaining to a given use case are executed, for a first instance, on a target database. Herein, the plurality of statements are a part of the software application. At step 104, first performance metrics pertaining to the first instance of execution of the given use case are collected. At step 106, the plurality of statements are executed, for a second instance, on the target database. At step 108, second performance metrics pertaining to the second instance of execution of the given use case are collected. At step 110, the first performance metrics and the second performance metrics are compared to determine at least one difference therebetween. At step 112, at least one alarm action is executed when the at least one difference is greater than a predefined threshold.

The steps 102, 104, 106, 108, 110, and 112 are only illustrative and other alternatives can also be provided where one or more steps are added, one or more steps are removed, or one or more steps are provided in a different sequence without departing from the scope of the claims herein.

Figure 2:
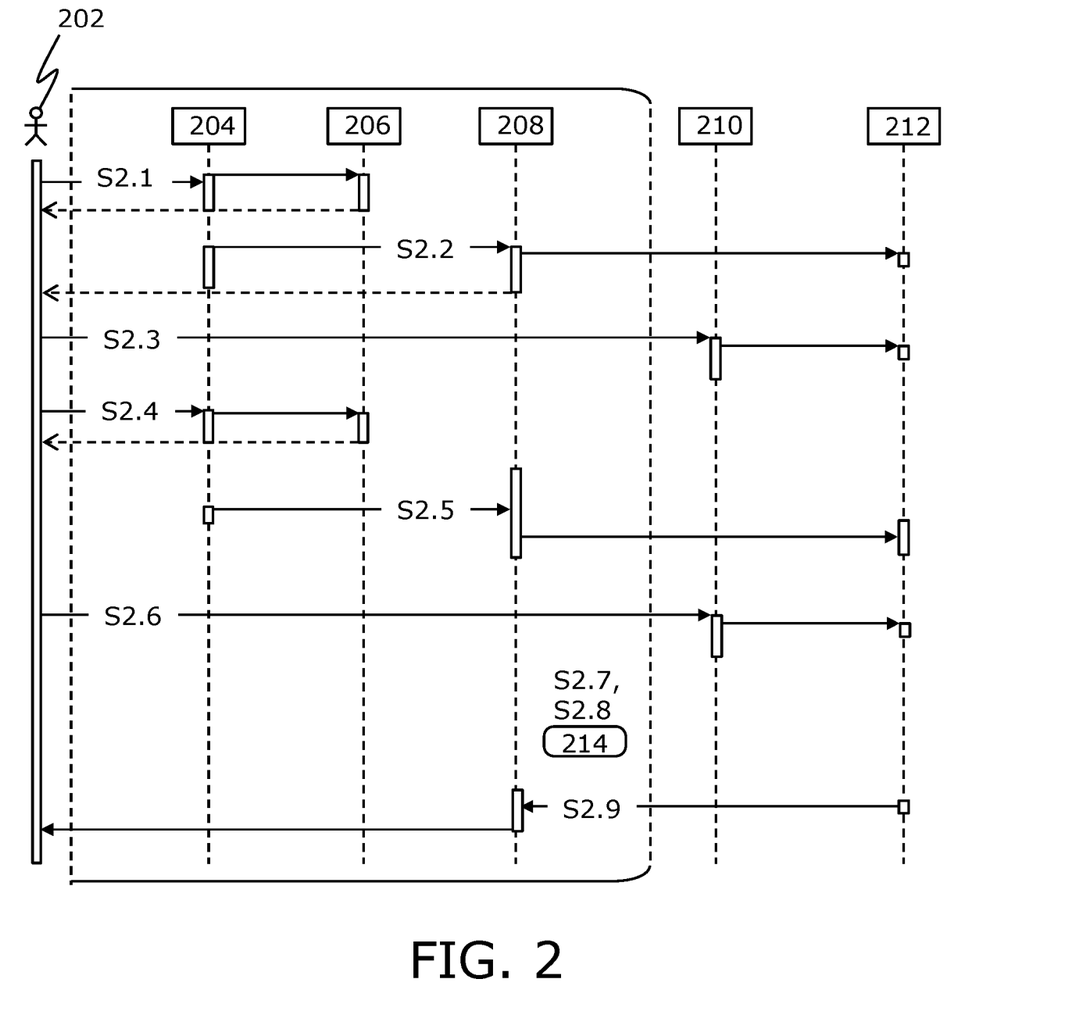
FIG. 2 illustrates an exemplary process flow for managing a performance for a use case in a software application, in accordance with an embodiment of the present disclosure.

Referring to FIG. 2, illustrated is an exemplary process flow for managing a performance for a use case in a software application, in accordance with an embodiment of the present disclosure. At step S2.1, a user 202 selects (via a dashboard 204) the use case whose performance is to be managed. Through the dashboard 204, a dashboard database 206 is checked for whether or not a first monitoring process for the performance of the use case has started or not. For example, an indication may be provided from the dashboard database 206 to the user 202 indicating that the first monitoring process has started. At step S2.2, a procedure for enabling collection of first performance metrics is initiated. A dashboard application of the dashboard 204 requests a dashboard agent 208 to enable extraction of a digest table from a target database 212. From the digest table, all queries executed before start of the first monitoring process are cleared. The dashboard agent 208 may, for example, notify the user of completion of this step. At step S2.3, a plurality of statements pertaining to the use case are executed for a first instance, on the target database 212, via an application database 210. The plurality of statements are added to a queue in the target database 212. First performance metrics pertaining to the first instance of execution of the given use case are collected at the target database 212. At step S2.4, the user 202 initiates (via the dashboard 204) execution of a plurality of statements pertaining to the use case, for a second instance. Through the dashboard 204, the dashboard database 206 is checked for whether or not a second monitoring process for the performance of the use case has started or not. As an example, an indication may be provided from the dashboard database 206 to the user 202 that the second monitoring process has started. At step S2.5, a procedure for enabling collection of second performance metrics is initiated. The dashboard application of the dashboard 204 requests the dashboard agent 208 to enable extraction of the digest table from the target database 212. From the digest table, all queries executed before start of the second monitoring process are cleared. At step S2.6, the plurality of statements pertaining to the use case are executed for the second instance, on the target database 212, via the application database 210. Second performance metrics pertaining to the second instance of execution of the given use case are collected at the target database 212. At step S2.7, the first performance metrics and the second performance metrics are compared to determine at least one difference therebetween. At step S2.8, at least one alarm action is determined when the at least one difference is greater than a predefined threshold. The steps S2.7 and S2.8 are executed by a server arrangement (namely, a process logic) 214. At step S2.9, the at least one alarm action is executed. The user 202 is shown an indication sent as the at least one alarm action.

Figure 3:
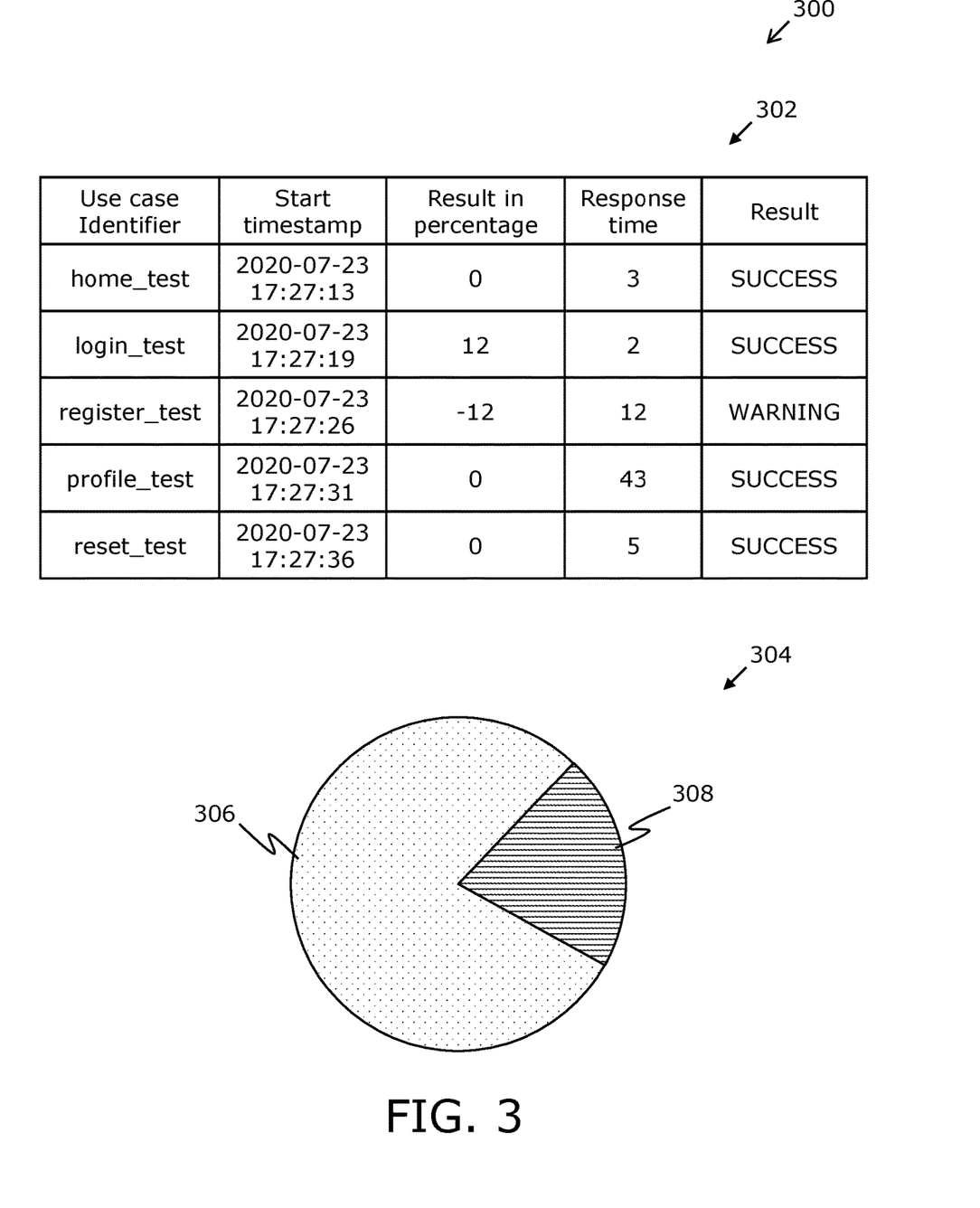
FIG. 3 illustrates an exemplary performance report, in accordance with an embodiment of the present disclosure.

Referring to FIG. 3, illustrated is an exemplary performance report 300, in accordance with an embodiment of the present disclosure. The performance report 300 comprises a table 302 comprising a plurality of rows and columns. Herein, information and performance metrics pertaining to an instance of execution of each of a plurality of use cases (for example, 5 use cases) of a software application is shown in the table 302. The columns of the table 302 show "Use case Identifier", "Start Timestamp", "Result in percentage" "Response Time" and "Result" of the instances of execution of the 5 use cases. The table 302 can be effectively employed to present to a user, a summary of requisite information and performance metrics collected during testing of the software application. As an example, results for four use cases are shown to be as "SUCCESS", while result for one use case (notably, the use case having identifier 'register_test') is shown to be as "WARNING". Moreover, there is no use case whose result is shown to be as "FAILURE" and/or "IMPROVEMENT". The use case having the identifier 'register test' may require action to be taken by a concerned personnel. As another example, response times for execution of difference use cases is different. The performance report 300 also comprises a pie chart 304 comprising different sectors. The sector 306 (depicted as dotted pattern) of the pie chart 304 depicts a total of four success counts (for four use cases). The sector 308 (depicted as horizontal line pattern) of the pie chart 304 depicts a total of one warning count (for one use case).

Figure 4:
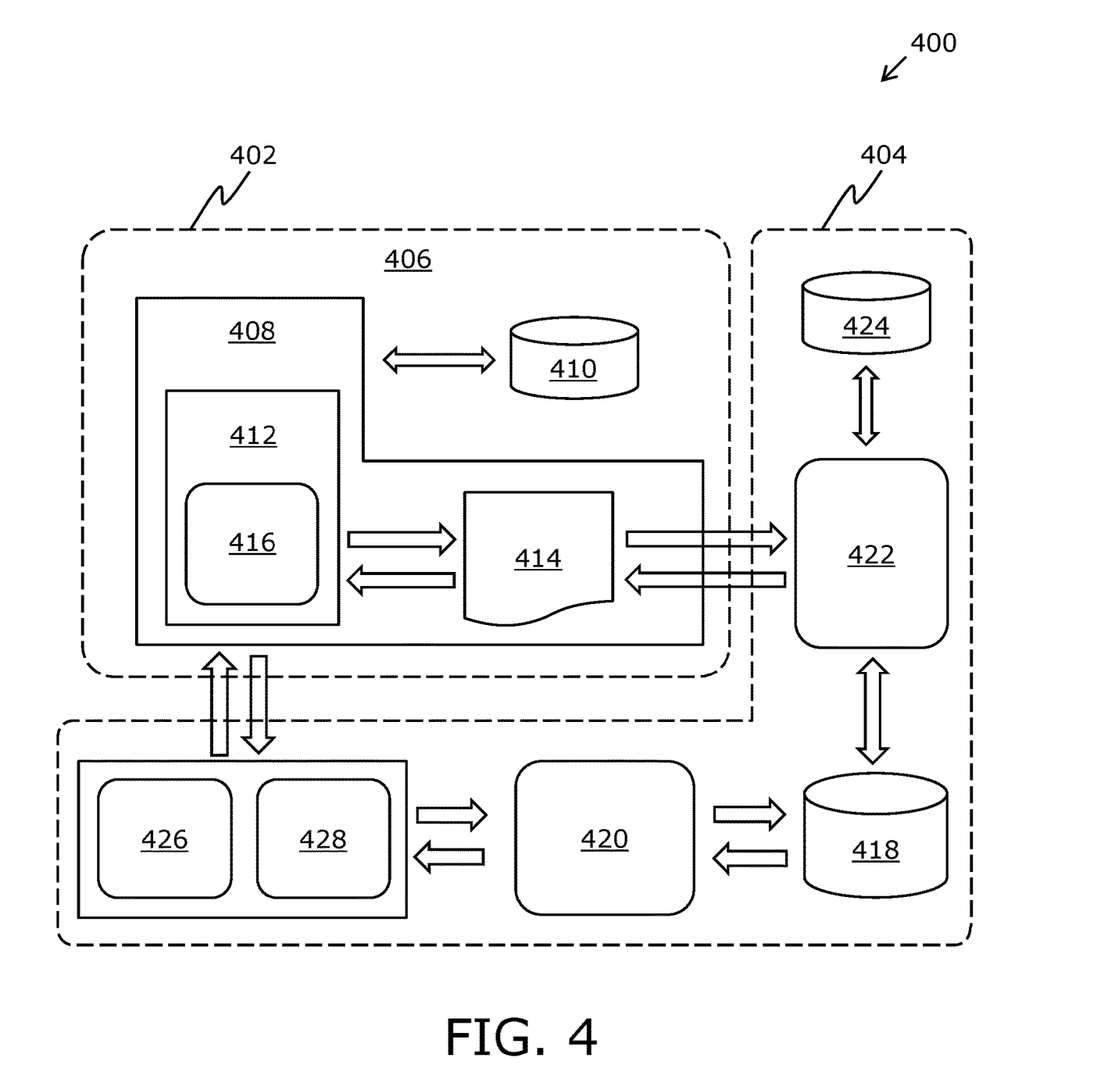
FIG. 4 illustrates a schematic illustration of an environment comprising a system premises and a client premises, in accordance with an embodiment of the present disclosure.

Referring to FIG. 4, illustrated is a schematic illustration of an environment 400 comprising a system premises 402 and a client premises 404. The system premises comprises a system 406 for managing a performance for at least one use case in a software application. The system 406 comprises a server arrangement 408 and optionally, a data repository 410. The server arrangement 408 is communicably coupled with the data repository 410. An application database (not shown) is stored at the data repository 410. The server arrangement 408 comprises at least one server (depicted as servers 412 and 414, communicably coupled to each other). At least one executable 416 (for example, such as a dashboard application, at least one alarm action, and the like) of the system 406 is executed on the server 412, and a dashboard database (not shown) is stored on the data repository 410. The system 406 may be understood to be a performance management tool. The client premises 404 (namely, target system premises) comprises a target database 418, a software application 420, an application agent 422, an agent database 424, a testing tool 426, and a DevOps tool 428. The application agent 422 is communicably coupled to the target database 418 and the agent database 424. Moreover, the application agent 422 is communicably coupled to the server 414 (for example, a JMS server). Moreover, the testing tool 426 and the DevOps tool 428 may be employed for testing a performance of the software application 420. The testing tool 426 and the DevOps tool 428 are shown to be coupled to the server arrangement 408.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

APPENDIX

1. Hereinbelow, there is provided an example algorithm of two consecutive instances of executions of statements.
First instance—select * from party where id=?
query metrics are eg.
NUM_EXECUTION=45
TOTAL_LOGICAL_READS=500
then again same use case is tested for second instance
select * from party where id=?
query metrics are eg.
NUM_EXECUTION=4545
TOTAL_LOGICAL_READS=45550
2. Hereinbelow, there is provided an example logic for collecting different metrics in different databases.
Example for MSSQL database:
NUM_EXECUTIONS
   ,total_logical_reads
   ,last_logical_reads
   ,total_logical_writes
   ,last_logical_writes
   ,total_worker_time
   ,last_worker_time
   ,total_elapsed_time_in_S
   ,last_elapsed_time_in_S
   ,total_rows
   ,last_rows
   ,total_physical_reads
Example for DB2 database:
ROWS_READ,
ROWS_DELETED,
ROWS_INSERTED,
ROWS_UPDATED,
ROWS_SELECTED,
COMMIT_SQL_STMTS,
ROLLBACK_SQL_STMTS,
FAILED_SQL_STMTS,
LOCKS_HELD, LOCK_WAITS,
LOCK_LIST_IN_USE,
DEADLOCKS,
LOCK_ESCALS,
TOTAL_SORTS,
TOTAL_SORT_TIME,
SORT_OVERFLOWS 3. Hereinbelow, there is provided an example logic of a corrective action
select * from customer where id=? executed 25334 times
select * from address where id=? executed 25334 times
TOTAL 50668 queries executed, there is foreign key from customer to address, the performance management tool finds FK from system table and iterates use case SQL to find FK child table, if found suggest to join tables rather than separate sqls
-->select cust.*, addres.* from customer cust
join address addres on addres.cust_ID=cust.id and addres.ID=?
where cust.id=?
--->AFTER JOIN 25334 SQLS executed

What is claimed is:

1. A method for managing a performance for at least one use case in a software application, the method comprising:
executing, for a first instance, a plurality of statements pertaining to a given use case on a target database, the plurality of statements being a part of the software application;
collecting first performance metrics pertaining to the first instance of execution of the given use case;
executing, for a second instance, the plurality of statements on the target database;
collecting second performance metrics pertaining to the second instance of execution of the given use case;
storing the collected first and second performance metrics in the target database;
comparing the first performance metrics and the second performance metrics to determine at least one difference therebetween; and
wherein the at least one use case comprises a plurality of use cases, and wherein the method further comprises:
enabling, via an interactive user interface, a user to add a set of configuration rules for breaking a build of the software application in a case of a given percentage of failed use cases out of the plurality of use cases being greater than a predefined threshold percentage;
enabling, via the interactive user interface, a user to add a set of configuration rules for breaking a build of the software application in a case of a failure of at least one critical use case from amongst the plurality of use cases; and
employing the set of configuration rules for testing a performance of the software application.

2. The method according to claim 1, wherein a given statement is one of: a Structured Query Language (SQL) statement, a Not only SQL (NoSQL) statement.

3. The method according to claim 1, wherein the at least one alarm action comprises sending at least one of: a ticket, an email, a visual user-interface alarm, a push notification, a notification using a business communication platform.

4. The method according to claim 1, wherein the first performance metrics and the second performance metrics comprise at least one of: a number of statements in the plurality of statements, a number of read rows in the target database, a central processing unit (CPU) usage, a memory usage, a missing index, a number of disk reads, database system level properties, a number of deadlocks, a number of lock wait timeouts, a duration of a given lock wait timeout, a number of commits, a number of rollbacks, a number of failed statements, response time, a number of sorts, sort time, a number of warnings.

5. The method according to claim 1, further comprising:
analyzing the first performance metrics and/or the second performance metrics to identify a problem in at least one of the plurality of statements and/or at least one database element of the target database;
determining at least one corrective action to be executed, based on the identified problem; and
executing the at least one corrective action to modify the at least one of the plurality of statements and/or the at least one database element of the target database.

6. The method according to claim 1, further comprising:
analyzing the first performance metrics and/or the second performance metrics to identify a problem in at least one of the plurality of statements and/or at least one database element of the target database;
determining, based on the identified problem, at least one advisory action to be recommended for modifying the at least one of the plurality of statements and/or the at least one database element of the target database; and
recommending the at least one advisory action to a concerned personnel.

7. The method according to claim 1, further comprising:
enabling the user to add a set of configuration rules for generating an alert in the case of the given percentage of failed use cases is greater than the predefined threshold percentage; and
enabling the user to add a set of configuration rules for generating an alert in the case of the failure of the at least one critical use case.

8. A system for managing a performance for at least one use case in a software application, the system comprising a server arrangement having a non-transitory machine-readable data storage medium on which are recorded program instructions, that when executed by computing hardware of the server arrangement, cause the server arrangement to:
execute, for a first instance, a plurality of statements pertaining to a given use case on a target database, the plurality of statements being a part of the software application;
collect first performance metrics pertaining to the first instance of execution of the given use case;
execute, for a second instance, the plurality of statements on the target database;
collect second performance metrics pertaining to the second instance of execution of the given use case;
store the collected first and second performance metrics in the target database; compare the first performance metrics and the second performance metrics to determine at least one difference therebetween; and
wherein the at least one use case comprises a plurality of use cases, and wherein the server arrangement is further configured to:
enable, via an interactive user interface, a user to add a set of configuration rules for breaking a build of the software application in a case of a given percentage of failed use cases out of the plurality of use cases being greater than a predefined threshold percentage,
enable, via an interactive user interface, a user to add a set of configuration rules for breaking a build of the software application in a case of a failure of at least one critical use case from amongst the plurality of use cases; and employ the set of configuration rules for testing a performance of the software application.

9. The system according to claim 8, wherein a given statement is one of: a Structured Query Language (SQL) statement, a Not only SQL (NoSQL) statement.

10. The system according to claim 8, wherein the at least one alarm action comprises sending at least one of: a ticket, an email, a visual user-interface alarm, a push notification, a notification using a business communication platform.

11. The system according to claim 8, wherein the first performance metrics and the second performance metrics comprise at least one of: a number of statements in the plurality of statements, a number of read rows in the target database, a central processing unit (CPU) usage, a memory usage, a missing index, a number of disk reads, database system level properties, a number of deadlocks, a number of lock wait timeouts, a duration of a given lock wait timeout, a number of commits, a number of rollbacks, a number of failed statements, response time, a number of sorts, sort time, a number of warnings.

12. The system according to claim 8, wherein the server arrangement is further configured to:
analyze the first performance metrics and/or the second performance metrics to identify a problem in at least one of the plurality of statements and/or at least one database element of the target database;
determine at least one corrective action to be executed, based on the identified problem; and
execute the at least one corrective action to modify the at least one of the plurality of statements and/or the at least one database element of the target database.

13. The system according to claim 8, wherein the server arrangement is further configured to:
analyze the first performance metrics and/or the second performance metrics to identify a problem in at least one of the plurality of statements and/or at least one database element of the target database;
determine, based on the identified problem, at least one advisory action to be recommended for modifying the at least one of the plurality of statements and/or the at least one database element of the target database; and
recommend the at least one advisory action to a concerned personnel.

14. The system according to claim 8, wherein the program instructions, when accessed by the processing device, further cause the processing device to:
enable the user to add a set of configuration rules for generating an alert in the case of the given percentage of failed use cases being greater than the predefined threshold percentage;
enable the user to add a set of configuration rules for generating an alert in the case of the failure of the at least one critical use case.

15. A computer program product for managing a performance for at least one use case in a software application, the computer program product comprising a non-transitory machine-readable data storage medium having stored thereon program instructions that, when accessed by a processing device, cause the processing device to:
execute, for a first instance, a plurality of statements pertaining to a given use case on a target database, the plurality of statements being a part of the software application;
collect first performance metrics pertaining to the first instance of execution of the given use case;
execute, for a second instance, the plurality of statements on the target database;
collect second performance metrics pertaining to the second instance of execution of the given use case;
store the collected first and second performance metrics in the target database; compare the first performance metrics and the second performance metrics to determine at least one difference therebetween; and
wherein the at least one use case comprises a plurality of use cases, and wherein the program instructions, when accessed by a processing device, further cause the processing device to:
enable, via an interactive user interface, a user to add a set of configuration rules for breaking a build of the software application in a case of a given percentage of failed use cases out of the plurality of use cases being greater than a predefined threshold percentage;
enable, via the interactive user interface, a user to add a set of configuration rules for breaking a build of the software application in a case of a failure of at least one critical use case from amongst the plurality of use cases; and
employ the set of configuration rules for testing a performance of the software application.

16. The computer program product according to claim 15, wherein the program instructions, when accessed by the processing device, cause the processing device to:
enable the user to add a set of configuration rules for generating an alert in the case of the given percentage of failed use cases being greater than the predefined threshold percentage;
enable the user to add a set of configuration rules for generating an alert in the case of the failure of the at least one critical use case.

* * * * *

UNITED STATES PATENT AND TRADEMARK OFFICE
CERTIFICATE OF CORRECTION

PATENT NO. : 11,874,760 B2
APPLICATION NO. : 17/366160
DATED : January 16, 2024
INVENTOR(S) : Mikko Larkela It is certified that error appears in the above-identified patent and that said Letters Patent is hereby corrected as shown below:

On the Title Page (73) Assignee: Larmik Oy, Turku (FI), delete "Lermik" and insert --Larmik--

Signed and Sealed this
Fifth Day of March, 2024

Katherine Kelly Vidal
*Director of the United States Patent and Trademark Office*